United States Patent
Geller et al.

(10) Patent No.: US 9,706,231 B2
(45) Date of Patent: *Jul. 11, 2017

(54) SYSTEMS AND METHODS FOR EVALUATING ONLINE VIDEOS

(71) Applicant: Integral Ad Science, Inc., New York, NY (US)

(72) Inventors: David Geller, Fairfax, VA (US); Kevin Lenane, Arlington, VA (US); Abel Mohler, Marshall, NC (US)

(73) Assignee: Integral Ad Science, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,739

(22) Filed: Aug. 12, 2015

(65) Prior Publication Data
US 2015/0348089 A1    Dec. 3, 2015

Related U.S. Application Data

(63) Continuation of application No. 14/281,484, filed on May 19, 2014, now Pat. No. 9,143,840.
(Continued)

(51) Int. Cl.
*H04N 21/234*    (2011.01)
*H04N 21/858*    (2011.01)
(Continued)

(52) U.S. Cl.
CPC ... *H04N 21/23418* (2013.01); *G06F 17/3082* (2013.01); *G06F 17/3089* (2013.01);
(Continued)

(58) Field of Classification Search
CPC ............ H04N 21/8586; H04N 21/433; H04N 21/466; H04N 21/251; H04N 21/44204; H04N 21/47217; H04N 21/4782; H04N 21/6125; H04N 21/6175; H04N 21/6581; H04N 21/812; H04N 21/23418;
(Continued)

(56) References Cited

U.S. PATENT DOCUMENTS 8,229,915 B1 * 7/2012 Lloyd ................ G06Q 30/0276
                                                        707/609
8,949,229 B1 * 2/2015 Chen ................. G06F 17/30817
                                                        707/723
(Continued)

*Primary Examiner* — Chenea Smith
(74) *Attorney, Agent, or Firm* — Bookoff McAndrews, PLLC

(57) ABSTRACT

Systems and methods for evaluating online videos. One method includes receiving a URL; determining a URL type; detecting whether the URL includes one or more videos; determining at least one of a size of the video, a position of the video on a web page of the web page URL, whether the video is set to autoplay, and whether the video is set to mute; computing a score based on one or more of the size of the video, the position of the video on the web page of the web page URL, whether the video is set to autoplay, and whether the video is set to mute; obtaining at least two frames of at least part of the video, wherein each frame is obtained at one or more predetermined intervals during playback of the video; and classifying each detected video based on the at least two frames.

14 Claims, 5 Drawing Sheets

Related U.S. Application Data

(60) Provisional application No. 61/825,403, filed on May 20, 2013.

(51) Int. Cl.

| | | |
|---|---|---|
| *H04N 21/442* | (2011.01) | |
| *H04N 21/433* | (2011.01) | |
| *H04N 21/466* | (2011.01) | |
| *G06Q 30/02* | (2012.01) | |
| *G06F 17/30* | (2006.01) | |
| *H04L 29/06* | (2006.01) | |
| *H04N 21/24* | (2011.01) | |
| *H04L 29/08* | (2006.01) | |
| *H04N 21/25* | (2011.01) | |
| *H04N 21/61* | (2011.01) | |
| *H04N 21/658* | (2011.01) | |
| *H04N 21/81* | (2011.01) | |
| *H04N 21/472* | (2011.01) | |
| *H04N 21/4782* | (2011.01) | |

(52) U.S. Cl.
CPC .. *G06F 17/30846* (2013.01); *G06F 17/30887* (2013.01); *G06Q 30/0242* (2013.01); *G06Q 30/0243* (2013.01); *H04L 65/60* (2013.01); *H04L 67/02* (2013.01); *H04L 67/20* (2013.01); *H04L 67/22* (2013.01); *H04N 21/2407* (2013.01); *H04N 21/251* (2013.01); *H04N 21/433* (2013.01); *H04N 21/442* (2013.01); *H04N 21/44204* (2013.01); *H04N 21/466* (2013.01); *H04N 21/6125* (2013.01); *H04N 21/6175* (2013.01); *H04N 21/6581* (2013.01); *H04N 21/812* (2013.01); *H04N 21/8586* (2013.01); *H04N 21/4782* (2013.01); *H04N 21/47217* (2013.01)

(58) Field of Classification Search
CPC ............. H04N 21/2407; H04N 21/442; G06Q 30/0242; H04L 67/20; H04L 67/22; H04L 67/02; H04L 65/60; G06F 17/30846; G06F 17/30887; G06F 17/3089; G06F 17/3082
See application file for complete search history.

(56) References Cited

U.S. PATENT DOCUMENTS

| | | | | |
|---|---|---|---|---|
| 2009/0327914 | A1* | 12/2009 | Adar | G06F 17/3089 715/745 |
| 2010/0306643 | A1* | 12/2010 | Chabot | G06F 17/30861 715/234 |
| 2010/0312608 | A1* | 12/2010 | Shan | G06F 17/30867 705/14.54 |
| 2011/0150433 | A1* | 6/2011 | Alexandrov | H04N 5/91 386/328 |
| 2011/0289182 | A1* | 11/2011 | Kong | G06F 17/30864 709/217 |
| 2013/0019149 | A1* | 1/2013 | Spencer | G06F 17/30864 715/202 |
| 2014/0195330 | A1* | 7/2014 | Lee | G06Q 30/0242 705/14.41 |

* cited by examiner

SYSTEMS AND METHODS FOR EVALUATING ONLINE VIDEOS

RELATED APPLICATIONS

This application is a continuation of U.S. Nonprovisional patent application Ser. No. 14/281,484, filed May 19, 2014, which claims the benefit of priority to U.S. Provisional Patent Application No. 61/825,403, filed May 20, 2013, the entireties of each of which are incorporated herein by reference.

TECHNICAL FIELD

Various embodiments of the present disclosure relate generally to evaluating online videos, such as digital videos distributed over the Internet. More specifically, particular embodiments of the present disclosure relate to systems and methods for evaluating online videos distributed over the Internet for improving advertising metrics.

BACKGROUND

As people increasingly consume content online, i.e., over the Internet, the importance of evaluating and tracking the quality and quantity of that consumption has increased. For example, many Internet entities, such as publishers of online content and online advertisers are now creating and distributing online videos over the Internet. Videos are often either a segment of content requested by an Internet user, an Internet advertisement created by an advertiser (e.g., a video ad similar to a television commercial), or some combination of requested content and a video ad.

Traditionally, advertisers and ad networks had little knowledge of the factors that affect true viewability of an online video: autoplay, player size, and position on the page. This lack of knowledge resulted in 'invalid impressions' which themselves caused a great deal of lost value in video ad buys.

Accordingly, a need exists for systems and methods for evaluating online videos, such as digital videos distributed over the Internet. More specifically, a need exists for systems and methods for evaluating online videos distributed over the Internet, such as for improving advertising metrics.

SUMMARY OF THE DISCLOSURE

According to certain embodiments, methods are disclosed for evaluating online videos. One method includes: receiving, at one or more servers, a URL to be reviewed; determining, by the one or more servers, a URL type for the received URL, wherein the URL type of the received URL is one of a web page URL and a video URL; detecting, by the one or more servers, whether the URL includes one or more videos; determining, by the one or more servers, for each video detected on a web page of a web page URL, at least one of a size of the video, a position of the video on a web page of the web page URL, whether the video is set to autoplay, and whether the video is set to mute; computing, by the one or more servers, for each video detected for a web page URL, a score based on one or more of the size of the video, the position of the video on the web page of the web page URL, whether the video is set to autoplay, and whether the video is set to mute; obtaining, by the one or more servers, for each video detected, at least two frames of at least part of the video, wherein each frame is obtained at one or more predetermined intervals during playback of the video; and classifying, by the one or more servers, each detected video based on the at least two frames.

According to certain embodiments, systems are disclosed for evaluating online videos. One system includes a data storage device storing instructions for evaluating online videos; and a processor configured to execute the instructions to perform a method including: receiving, at one or more servers, a URL to be reviewed; determining, by the one or more servers, a URL type for the received URL, wherein the URL type of the received URL is one of a web page URL and a video URL; detecting, by the one or more servers, whether the URL includes one or more videos; determining, by the one or more servers, for each video detected on a web page of a web page URL, at least one of a size of the video, a position of the video on a web page of the web page URL, whether the video is set to autoplay, and whether the video is set to mute; computing, by the one or more servers, for each video detected for a web page URL, a score based on one or more of the size of the video, the position of the video on the web page of the web page URL, whether the video is set to autoplay, and whether the video is set to mute; obtaining, by the one or more servers, for each video detected, at least two frames of at least part of the video, wherein each frame is obtained at one or more predetermined intervals during playback of the video; and classifying, by the one or more servers, each detected video based on the at least two frames.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

In view of the challenges outlined above, systems and methods are disclosed for evaluating online videos, such as digital videos distributed over the Internet.

Figure 1:
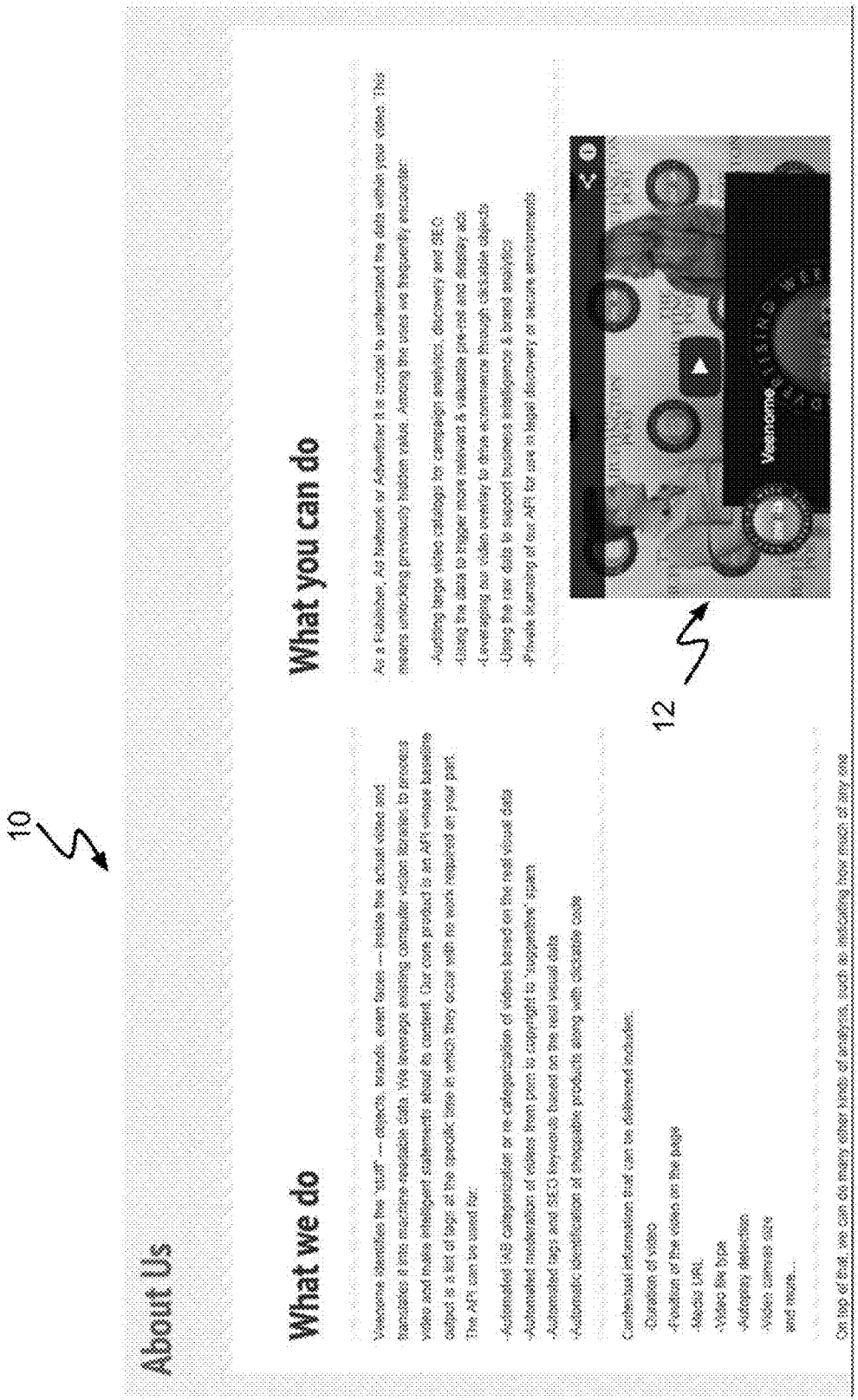
FIG. 1 is a screenshot of an exemplary web page containing an embedded digital video, according to an exemplary embodiment of the present disclosure.

Referring now to the figures, FIG. 1 depicts a screenshot of an exemplary web page 10 of any given website. The web page 10 may be formatted for any type of desktop or mobile browser, and may be accessed by any device configured to send and receive HTTP communications and/or HTML content. As shown in FIG. 1, web page 10 may have embedded therein a digital video 12. The digital video 12 may be of any type or format, including a flash video, HTML5 video, and so on. The digital video 12 may be positioned at any location of the web page 10 and may have any desired size. In one embodiment, digital video 12 may be positioned on web page 10 such that it appears "above the fold," that is, it is visible within the browser window when a user first visits the web page. In another embodiment, the digital video 12 may be positioned partially or entirely "below the fold," meaning the user may have to scroll down to view the entire video.

In one embodiment of the present disclosure, systems and methods relate to detecting and evaluating the position of a video on a web page, the size of the video player, and/or whether the video is on autoplay or muted. In one embodiment, the presently disclosed systems and methods may be delivered through a video indexing API that detects and evaluates one or more of those features or characteristics. In one embodiment, the presently disclosed systems and methods may detect these factors and allow each Internet customer (e.g., an online advertiser or publisher) to define their own "viewability" standard or score for uniformly evaluating video viewability. For example, if the video is more than 50% above the fold and set to autoplay, the impression could be classified as valid. However, if the video is set to autoplay and located below the fold, then the video could be classified as invalid. The absence of audio during autoplay could also impact the validity of the impression. In addition to elimination of various forms of impression/pre-roll fraud, the disclosed systems and method may bring further transparency to the rapidly growing video ad industry.

Figure 2:
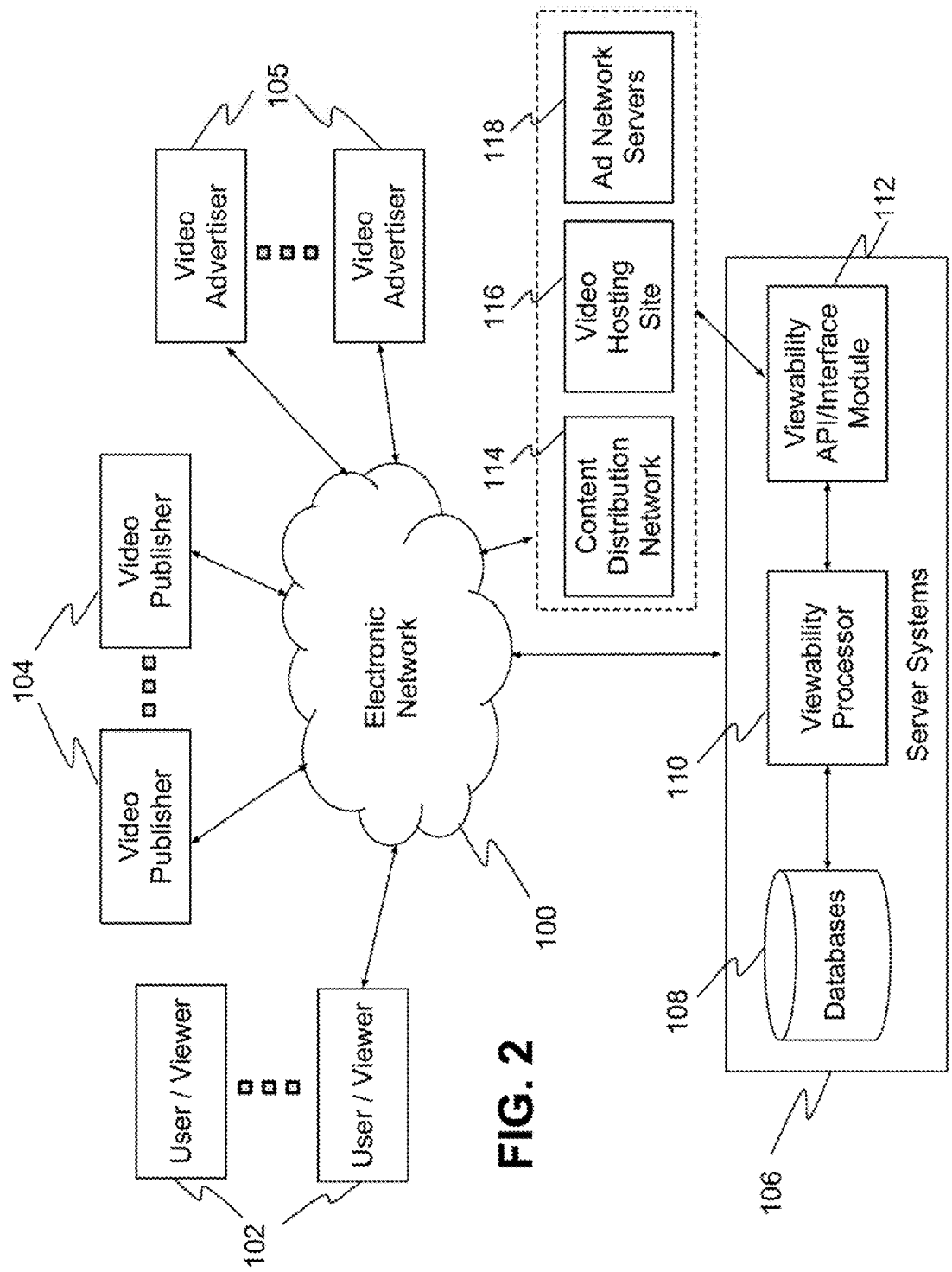
FIG. 2 is a schematic diagram of a network environment and system for evaluating online videos, according to an exemplary embodiment of the present disclosure.

FIG. 2 is a schematic diagram of an exemplary environment in which online videos may be evaluated and/or scored, according to an exemplary embodiment of the present disclosure. As shown in FIG. 2, the system and environment may include a plurality of users or viewers 102 disposed in communication with an electronic network 100. Electronic network 100 may be the Internet, or any other combination of wired and/or wireless electronic networks. Users or viewers 102 may be any people configured to view, transmit, upload, and/or download videos over the Internet using any type of electronic device, such as a computer or mobile device connected to the Internet. In one embodiment, each device of users or viewers 102 may include a server, personal computer, tablet computer, mobile device, smartphone, and/or personal digital assistant ("PDA") disposed in communication with electronic network 100. Each of the user or viewer devices may have a web browser or mobile browser installed for receiving and displaying content from web servers. Thus, each of the user or viewer devices may be configured to receive and display data that is received and processed, over electronic network 100.

FIG. 2 also depicts a plurality of video publishers 104 and video advertisers 105 also in communication with electronic network 100. Video publishers 104 may be any entities that create or receive video content that they then display to users/viewers 102 over the Internet. Video advertisers 105 may be any entities that create or receive video that advertises a good or service associated with the advertisers. In certain embodiments, video advertisers 105 may provide or make available to video publishers 104 the one or more videos that the video advertiser 105 wishes to have displayed on a web page of the video publisher, either as a standalone video, as a video advertisement, or as an introduction or interruption of other video content.

FIG. 2 also depicts a content distribution network 114, a video hosting site 116, and ad network servers 118 all disposed in connection with electronic network 100. Each of the content distribution network 114, video hosting site 116, and ad network servers 118 may be configured to interact with one or more of the users/viewers 102, video publishers 104, and video advertisers 105 to execute any desired method for facilitating the distribution of video content and/or video advertising between those entities. For example, the content distribution network may facilitate storage and/or load balancing functionalities used for video publishers 104 to distribute videos to users/viewers 102. Video hosting site 116 may provide a recommendation engine, a search tool, or any other combination of features enabling users/viewers 102 to explore and discover video content. Ad network servers 118 may interact between video publishers 104 and video advertisers 105 to facilitate inserting video advertisements into video content, and/or displaying video advertisements to users/viewers 102. Any of the devices or functionality of content distribution network 114, a video hosting site 116, and ad network servers 118 may be combined together or separated, and may be operated by a single administrative entity, or outsourced to one or more other entities, such as a web hosting entity, web storage entity, and/or cloud computing service, possibly disposed remotely of each other.

As shown in FIG. 2, a plurality of server systems 106 may also be disposed in communication with electronic network 100. In general, server systems 106 may be configured to receive over electronic network 100 any number of videos and/or uniform resource locators ("URLs") to web pages that may contain embedded videos, and then evaluate and/or score videos according to one or more video viewability techniques. As shown in the embodiment of FIG. 2, server systems 106 may include a viewability processor 110, which may be configured to execute an evaluation and/or scoring algorithm, which may evaluate and/or score videos and/or web pages containing videos received over electronic network 100. Server systems 106 may also include one or more databases 108, that store evaluation and/or scoring algorithms in memory (e.g. on a computer readable medium), and where viewability processor 110 may be configured to store received videos and/or URLs of web pages containing videos, and/or results of performing the evaluation and/or scoring algorithm in memory (e.g., on a computer readable medium). Any received data may be stored in the databases 108 in an encrypted form to increase security of the data against unauthorized access. Any of the devices or functionality of server systems 106, content distribution network 114, and/or a video hosting site 116 may be combined together or separated, and may be operated by a single administrative entity, or outsourced to one or more other entities, such as a web hosting entity, web storage entity, and/or cloud computing service, possibly disposed remotely of each other.

Server systems 106 may also include a viewability application programming interface ("API")/interface module 112 that facilitates receiving videos and/or URLs of web pages containing videos from one or more of users/viewers 102, video publishers 104, video advertisers 105, content distribution network 114, video hosting site 116, and ad network servers 118. API/interface module 112 may also be configured to update and transmit revised or updated video or evaluation content, including lists of scores, featured videos, etc., as will be described in and with respect to the exemplary method of FIG. 3.

Figure 3:
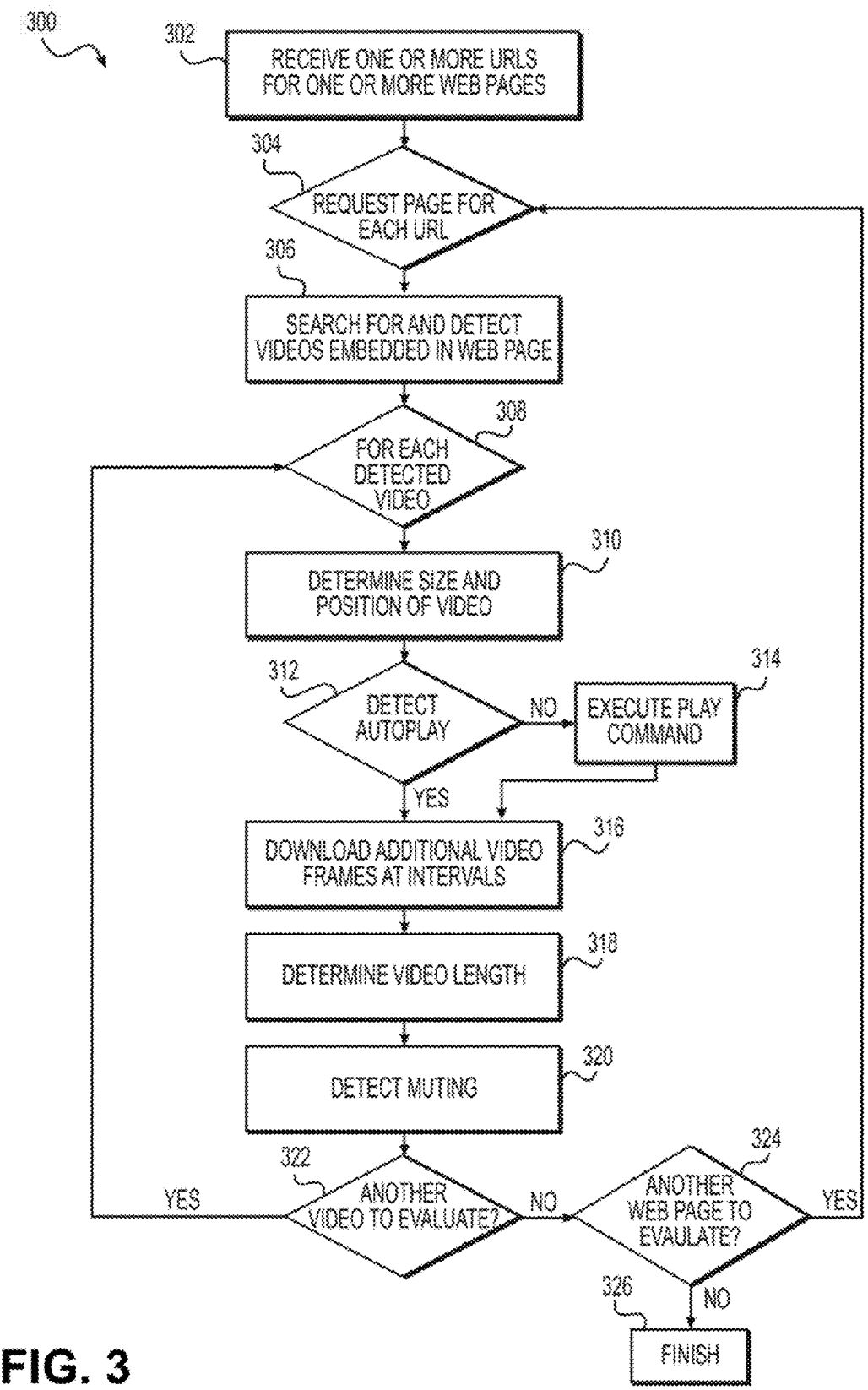
FIG. 3 is a flow diagram of a method for evaluating online videos, according to an exemplary embodiment of the present disclosure.

FIG. 3 is a flow diagram of a method 300 for evaluating and scoring online videos according to an exemplary embodiment of the present disclosure. In one embodiment, server systems 106, including one or more of databases 108, viewability processor(s) 110, and viewability API/interface module 112 may be configured to perform method 300. Alternatively, or additionally, any component or entirety of server systems 106 may be configured to interact with one or more of video publishers 104, video advertisers 105, content distribution network 114, video hosting site 116, and ad network servers 118 to perform method 300.

In one embodiment, method 300 may include determining the viewability of a video or video ad on a web page, such as through a video downloading process, to effectively measure various characteristics of the video related to the video's viewability, such as: (i) a video player size, (ii) whether the video is set to autoplay or not, (iii) whether the video is set to "mute", (iv) the presence of additional videos on the page, and/or (v) the positioning of the player on the page. In addition, other characteristics of the video's viewability may also be measured, such as the duration of the video, quality of the video (e.g., low definition, standard definition, or high definition), etc. In one embodiment, the size of the player, the percent of the player that is "above the fold" (i.e., within viewable screen space), and whether the video is on autoplay/mute may contribute to a score that represents the viewability value of the video.

In general, method 300 may include collecting frames of online videos and ascertaining the geometric viewability of a video on a page by downloading frames and/or imagery from a video for visual indexing. The method may include the use of an "automated web browser" operating, for example, on viewability processor 110 of server systems 106 that grabs information about videos embedded on arbitrary web pages. Obtained information may include one or more of the following: x position, which is the offset from the left side of the browser window assuming a defined window width; y position, which is the offset from the top of the page; width, which is the width of the embedded video; height, which is the height of the embedded video; autoplay, which is whether the embedded video is set to automatically play upon page visit; relevancy score, which may be a floating point number, relative to other scores on the page, which determines relevancy to the viewer (a mathematical estimation of which videos a user is most likely to view on a page, from highest to least likely); and/or frames, which are frames of still images from the video, at one or more specified interval (e.g., from about 0.1 seconds to about 10 seconds).

Figure 4:
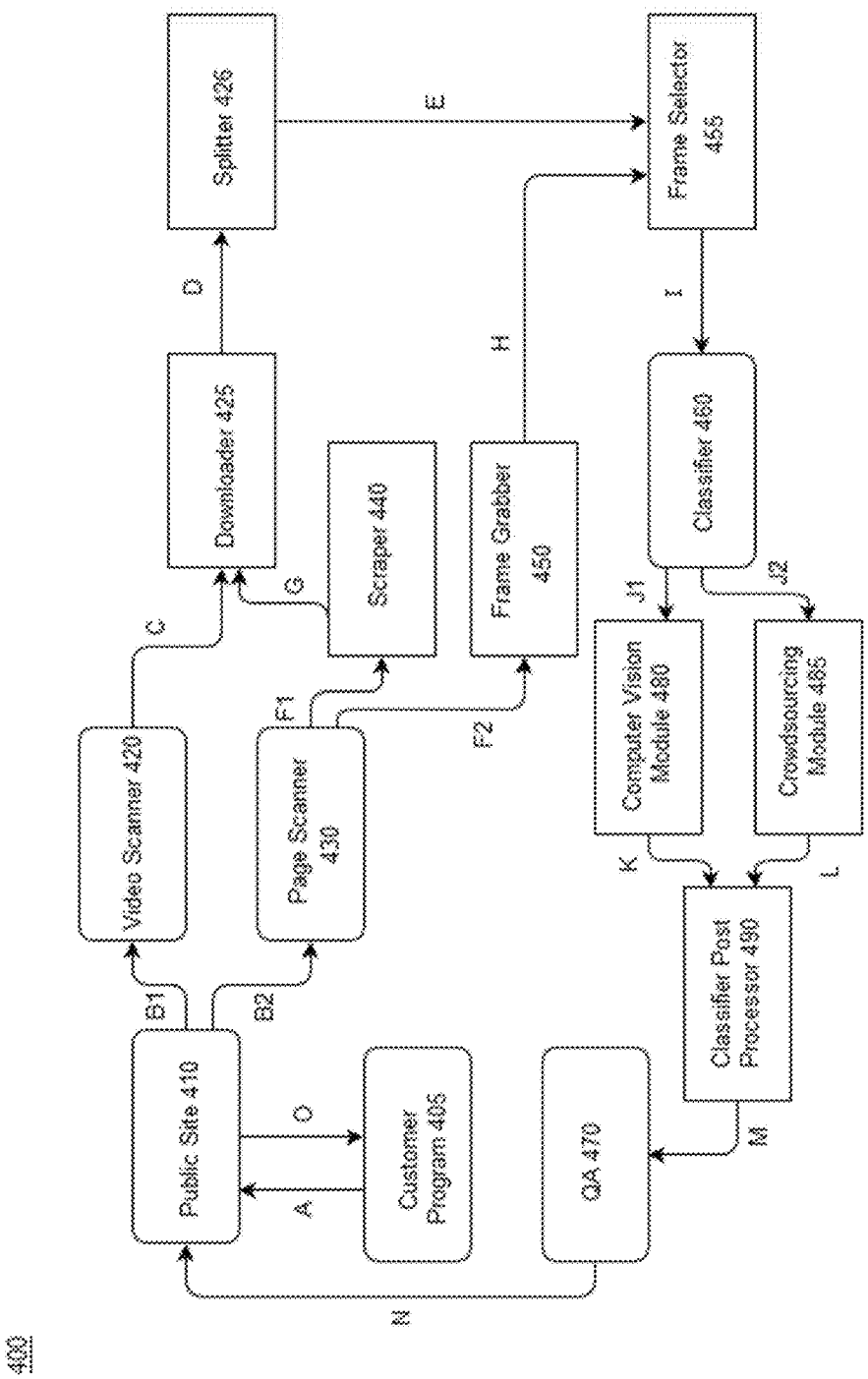
FIG. 4 is a diagram of an exemplary system for evaluating videos by classify, according to an embodiment of the present disclosure.

Referring now to FIG. 3, method 300 may begin with receiving one or more URLs or one or more web pages (step 302). For example, in one embodiment, a frame grabber, such as frame grabber 450 as shown in FIG. 4, may be an automated server based system that is relayed a page URL that may or may not contain a video. This page URL could come from (i) a large list of page URLS, (ii) a standard ad call embedded in a 1×1 pixel, end/or (iii) a call to the viewability API/interface module 112 or one of a number of other methods used to send data.

The frame grabber or other module of server system 106 may request the web page associated with each URL (step 304). The frame grabber or other module of server system 106 may then search the code of the received web page to locate any embedded videos (step 306). In one embodiment, the automated web browser running on server system 106 may parse the web content into a document object module DOM using query APIs, searching for all elements of the type: OBJECT, EMBED, and/or VIDEO, given that most Flash videos are of type OBJECT, for historical reasons, some Flash videos are of the type EMBED, and all instances of the HTML 5 VIDEO element are considered to be videos. In one embodiment, to eliminate unlikely videos, objects of small size may be eliminated from the query list. Secondly, objects that do not match height and width aspect ratio specifications may be eliminated from the query list.

In one embodiment, an aspect ratio may be determined by a product of video width and height:

$$R = W/H$$

Likely videos, on aspect ratio alone, may be determined with the following formulas based on fuzzy forgiveness of standardized 16:9 and 4:3 aspect ratios:

| W <= 400 px | R >= 1.2 && R <= 1.9 |
| W > 400 px | R >= 1.1 && R <= 2.4 |

Objects, such as videos, that do not fall within these parameters may be eliminated from consideration.

Also, in another embodiment, IFRAME elements may be evaluated for their ability to contain videos. Elements that do not match the same aspect ratio requirements of OBJECT and EMBED elements, may be eliminated. Elements that are left over may be inspected for video elements. In one embodiment, inspection is done through the contentDocument property available through the browser's JavaScript API. For browsers subject to the "same origin policy," preventing inspection of the contentDocument on remote iframes, cross domain requests may be enabled by disabling browser security.

In one embodiment, method 300 may then include, for each detected video (step 308), determining a size and/or position of the video (step 310). First, the frame grabber or another module running on server systems 106 may measure the pixel position of the one or more videos from the northwest (top left) corner of the web page (Y pixels down and X pixels right from the NW page origin). The frame grabber or another module running on server systems 106 may then measure the player size in pixels (width and height) of the videos on the page.

In one embodiment, after initial query, each element may be processed using the browser's JavaScript API, and WC3 properties may be utilized to determine element position on screen, and size.

| Property | W3C Method |
| --- | --- |
| X Position | HTMLElement.offsetLeft |
| Y Position | HTMLElement.offsetTop |
| Height | HTMLElement.offsetHeight |
| Width | HTMLElement.offsetWidth |

Because the offsetLeft and offsetTop properties give the position relative to the offsetParent, to determine the position relative to the document the DOM may be traversed through all of the parents until the document is reached.

The frame grabber or another module running on server systems 106 may then take screenshots at any one or more suitable intervals, such as intervals of about 0.1 seconds to about 10 seconds, of those video areas to detect any initial changes (autoplay) in the visual content of those screens. Visual changes may indicate autoplay or non-user initiated commencement of content. When the web page loads, screenshots may be taken of the entire browser window, at a set interval. Once the presence of autoplay is determined for every video on the web page and an attempt has been made to start each video, screenshots may be cropped based on X, Y, Height, and Width of each set of parameters, and catalogued for each corresponding video by saving these screenshots in memory.

If autoplay is detected (step 312, yes), then the frame grabber or another module running on server systems 106 may automatically download additional frames at any one or more suitable intervals, such as intervals of about 0.1 seconds to about 10 seconds for the length of the actual video content (step 316). These frames may be used for content subject indexing (subject categories, classification, moderation, etc), as discussed below. After a set number of frames have been cropped from screenshots, a certain number of frames may be discarded at the beginning of the frame set, and the rest may be compared for equality, either by byte size or generated hash. Before comparison, frames may be cropped even more, using only a small sample from the center of each frame, to avoid most false autoplay positives found on videos with animating user interfaces around the border area. If a video is found not to autoplay, then the frames may be scraped and an attempt may be made to start the video, and recursively enter the frame scrape cycle again.

If autoplay is not detected (step 312, no), then the frame grabber or another module running on server systems 106 may execute a play command using automated user interface ("UI") tools, and then automatically download additional frames at any one or more suitable intervals, such as intervals of about 0.1 seconds to about 10 seconds, for the length of the actual video content (step 316). Again, these frames may be used for content subject indexing (subject categories, classification, moderation, etc.). Specifically, if it is determined that a video does not autoplay, then a play command may be executed (step 314). First, the JavaScript method of HTMLElement.play( ) may be attempted, which usually returns an error in the case of OBJECT or EMBED. Upon an error, the mouse cursor may be moved to the center of the object and simulate a click event. This technique may achieve very high accuracy and reliability.

The duration of the video may then be calculated after the video has been downloaded based on knowledge of the frames per second and the whole number of frames (step 318).

The presence or non-presence of sound (i.e., muting) may then be detected by measuring sound changes when video is played during detection of autoplay (step 320).

Multiple videos on a single web page may be detected, and the same processing may be run on all instances of videos on the web page (step 322).

If additional web pages are to be evaluated (step 324, yes), then method 300 may repeat in relation to additional received web pages or URLs to web pages.

Using the above method to gather positional, size, sound, duration, and/or autoplay information enables assembly of unique metrics to create a video "viewability score", which may be used in online advertising methods.

In one embodiment, the score may be comprised of one or more pieces of information, as discussed below.

One piece of information that may be used to determine a viewability score is the percent of a video that exists above the average "fold" of the computer screen, such as 1200 pixels, calculated using the video and/or player size and coordinates. For example, the percentage above the fold may be divided by 2 for a total maximum score of fifty points.

If autoplay is not detected for the video in question, then the video may receive an additional 20 points. If autoplay is detected, then the video may receive zero additional points.

If there are no other videos on the web page, then the video may receive an additional 10 points. If there are other videos on the web page and none of those other videos do not have autoplay then the video in question may receive 5 additional points. If there are additional videos on the web page that have autoplay, then the video may receive no additional points.

If the video in question is not on mute (has sound), then the video may receive 20 additional points. If the video in question is on mute, then the video may receive no additional points.

The total viewability score represented above may range in total from 0 to 100 points. However, points assigned to each piece of information may be any value, and the total viewability score may be an open-ended range.

In order to improve accuracy of information returned, videos may be scored with a floating point number. This number may represent a comparison to other videos on the web page, and allow returning the videos in an order of most to least relevant. In one embodiment, the relevancy score formula may be calculated as follows:

$Y \text{ Score} = \text{Base } Y \text{ Score} - Y \text{ Position}$ $X \text{ Center Score} = \text{Base } X \text{ Center Score} - (\text{Distance from } X \text{ Center} * 2)$ $\text{Base Score} = Y \text{ Score} + X \text{ Center Score}$ $\text{Size Adjustment Score} = \text{Video Area}(H \times W) / \text{Largest Video Area}$ $\text{Final Score} = \text{Size Adjustment Score} * \text{Base Score}$ The above scoring is just one example of the types of viewability scores that may be provided using the above disclosed systems, methods, and APIs. It is expected that additional scoring systems may be developed and contemplated within the scope of this disclosure based on receiving data including video/player size, video/player coordinates, autoplay enabled/disabled, muting enabled/disabled, and multi-video detection.

FIG. 4 depicts an exemplary system for producing classifications for videos, according to aspects of the present disclosure. Specifically, FIG. 4 depicts a general web-based system (hereafter, "system") 400 for obtaining classifications of videos. The system 400 functions by taking an input that contains a specification of the video or web page in question, and returns a classification result. The system 400 may be controlled either by an external program written by a customer/user using a defined API, or more directly by using a web page UI. The possible classifications which may be obtained from a particular video are completely flexible, and may be from a pre-defined or dynamic short list, a pre-defined or dynamic long list (consisting of up to millions of possibilities with arbitrary organization), or free-form.

Which classifications are allowed, as well as other job parameters, may be controlled via a job profile, which is either explicitly or implicitly sent along when a job is created. A "job" may be an independent unit of work for the system 400. System 400 may be used by sending a job for each video or web page that a user wants to be analyzed. Any number of jobs may be processed simultaneously (given sufficient system resources), and each job may be running independently under any valid profile.

In one embodiment, system 400 may handle two fundamentally different job types, such as a video job, and a web page job (also referred to as a "page job"). A video job may be used when a user wants to analyze a single video, with a well-defined media URL (hereafter, "video URL") in a well-defined format. A page job may be used to analyze a URL of a HTML web page (hereafter, "page URL"), which may or may not contain one or more videos. The page URLs may be of an unknown media that is running various video players in various video formats, which the system 400 may find and analyze. A video job may produce a result for the video analyzed and/or evaluated, or may produce no result when a video is not found or the system 400 is unable to analyze and/or evaluate the video. A page job may produce one or more results. For a page job, each result produced corresponds to a video of the one or more videos found and analyzed/evaluated on the web page. If no videos are found on the web page, or if a particular video is unable to be analyzed and/or evaluated, then no result will be produced for the web page or the particular video.

In one embodiment, the system 400 consists of one or more of the following subsystems: a public site 410, a video scanner 420, a page scanner 430, a scraper 440, a frame grabber 450, a classifier 460, and/or quality assurance ("QA") 470.

Public site 410 may be a public-facing website available via web page UI, as well as a representational state transfer ("REST") API or other type of API. The functions of public site 410 may include customer account creation and administration functions that allows the creation, setup, and/or administration of a customer account. For example, this function may include the creation, setup, and/or administration of usernames, passwords, API key management, etc. Public site 410 also includes functions that handle customer payments and balances, provide online documentation and ancillary information, accept and process API requests from authorized users/customers, and/or gather and display statistics. Public site 410 also includes various job functions that may be accessed via a web page UI and/or an API. These job functions include creating of new jobs, such as a video job or a page job, and viewing existing jobs. Viewing existing jobs allows for a customer to view a job status, one or more job results, job errors, etc. Jobs may be viewed through various selection methods, including, but not limited to, selections on a customer basis, sorting, searching, etc. Another job function may also be the ability for a customer to delete one or more jobs.

Video scanner 420 is responsible for scanning and/or analyzing videos from one or more video jobs. Video scanner 420, by itself or through other subsystems, may analyze one or more videos by downloading each video (using the video's URL), may split each video into two or more still frame images at a 1 second interval (or any one or more intervals as mentioned above), and may present a selected list of still frames directly or indirectly to classifier 460.

Page scanner 430 is responsible for scanning web pages from one or more page jobs. Page scanner 430 may scan web pages by using scraper 440 or frame grabber 450, as discussed below. Starting with a URL for a web page, page scanner 430, through scraper 440 or frame grabber 450, may produce a list of still frames, which may be sent directly or indirectly to classifier 460.

Scraper 440 may use a site-specific script to actually scrape a web page to find any video URLs. Each video URL may then be treated as a video job, in which videos are downloaded and split, as discussed above in reference to video scanner 420.

Frame grabber 450 may use technology, as described above, to produce frames by interacting with a web page through an embedded, headless web browser. Since the web page is not a video URL, any number of videos may be found and processed for the web page. In addition to producing frames, frame grabber 450 may find and/or determine "viewability data" for each video, as discussed above. A benefit of using frame grabber 450 is that audio and frames from a video may be accessed and stored without having direct access to video.

Classifier 450 may receive frames of a video, which were produced by video scanner 420 and/or page scanner 430, and determines a classification. Classifier 450 may also receive audio and other data for the video, and use the audio and other data in the determination of a classification. The universe of possible classifications for a given video is specified when the job is created. The system 400 may use one or more of computer vision ("CV"), crowdsourcing, and/or crowd-based (human) techniques to obtain an accurate classification.

QA 470 may be responsible for allowing automatic evaluation and/or human evaluation and editing of final results produced by system 400. Additionally, QA 470 allows for the creation and managing of gold samples, which are sets of frames with a predetermined set of possible correct classifications. These gold samples may be sent through the system 400 masquerading as actual samples for videos, so that accuracy may be gauged via statistical techniques.

The system 400 of FIG. 4, either alone or together with the systems and methods of FIGS. 1-3, may be configured to perform a method of evaluating and/or classifying videos. In one embodiment, a customer program 405, via an API, makes a job request to the public site 410 to create a new job, as shown by arrow A. Alternatively, a customer may enter a job request directly into public site 410, via the web page UI. The job request may contain various pieces of information, including classifications to use, a type of classification list to use, a job type, one or more URLs of one or more videos and/or one or more web pages, etc.

For video jobs, public site 410 may send the video URL to video scanner 420, as shown by arrow B1. Video scanner 420 may call downloader 425 with the video URL and other information, as shown by arrow C. Downloader 425 may download the video into a local/accessible storage, and may call splitter 426 with a location of video file, as shown by arrow D. Splitter 426 may split the video file into frames at one or more intervals, as discussed above, and may store each frame as a separate file in the local/accessible storage. Splitter 426 may then passes a list of frames to a frame selector 455, as shown by arrow E.

For page jobs, public site 410 may send a web page URL to page scanner 430, as shown by arrow B2. After receiving the web page URL, page scanner 430 may send the web page URL and other information to either: (i) scraper 440, as shown by arrow F1; or (ii) frame grabber 450, as shown by arrow F2. Whether page scanner 430 sends the web page URL to scraper 440 or frame grabber 450 is determined by one or more different factors, including, but not limited to, the nature of the web page URL, the job profile, system defaults, etc.

For a web page URL sent to scraper 440, scraper 440 may search and/or analyze the web page to attempt to find one or more video URLs. If scraper 440 finds one or more video URLs, scraper 440 may send, for each video URL found, the video URL to downloader 425, as shown by arrow G, where the video URL is processed as discussed above.

For a web page URL sent to frame grabber 450, frame grabber 450 may find one or more videos on the web page, and may obtain frames for each video found on the web page. Frame grabber 450 may store each frame as a separate file in the local/accessible storage. Frame grabber 450 may then sends a list of frames and other information to frame selector 455, as shown by arrow H.

Frame selector 455 may receive, for each video, a list of frames from either splitter 426 or frame grabber 450. Frame selector 455 may decide which frames are suitable for subsequent analysis, may create a list of suitable frames, and may pass this filtered list with other information to classifier 460, as shown by arrow I.

Using techniques involving CV and/or crowdsourcing, classifier 460 may compute/determine one or more classifications for a video, based on each set of frames received and any other information, including audio, that was received and that is associated with the video. If classifier 460 uses CV techniques to classify a video, each set of frames and any other information, including audio, may be sent to computer vision module 480, as shown by arrow J1. Computer vision module 480 may compute/determine one or more raw classification results and may send the one or more raw classification results to classifier post processor 490, as shown by arrow K. Computer vision module 480 may also search for and/or identify one or more objects within each frame. Each of the objects found and/or identified within each frame may be tagged. The object tags may be mapped to one or more particular classifications, and/or the object tags may be used to look-up one or more previously mapped classifications for the tag. Once the object tag is mapped and/or looked-up, the resulting one or more classifications for the object may be used to compute/determine one or more raw classification results for the video being evaluated.

If classifier 460 uses crowdsourcing techniques to classify a video, each set of frames and any other information, including audio, may be sent to crowdsourcing module 485, as shown by arrow J2. Crowdsourcing module 485 may compute/determine one or more raw classification results and may sends the one or more raw classification results to classifier post processor 490, as shown by arrow L.

Classifier post processor 490 may filter and/or modify the one or more raw classification results, depending on certain conditions. The one or more processed classification results and/or the one or more raw classification results may be stored by classifier post processor 490 in the local/accessible storage. Classifier post processor 490 may send the one or more processed classification results and/or the one or more raw classification results to QA 470, as shown by arrow M.

Using one or more of a variety of techniques, including advanced statistics, heuristics, and/or personnel of various experience levels, one or more processed classification results and/or the one or more raw classification results may be quality assured, and may be given final approval in QA 470. QA 470 may send one or more final classification results, as well as one or more processed classification results and/or the one or more raw classification results, to public site 410, as shown by arrow N, where each of the results may be stored, along with other important information. A customer may view the one or more final classification results, one or more processed classification results, and/or the one or more raw classification results through a web page UI of public site 410 and/or through an appropriate API call to public site 410 via customer program 405, as shown by arrow O.

In one embodiment of the present disclosure, a domain based viewability score analysis and/or classification analysis (hereafter, "assay") may be performed for a plurality of URLs for a domain, including, but not limited to, a particular web page of a domain, a portion of all of the web pages of a domain, and/or all of the web pages of a domain. An assay allows for the tracking of how often videos and/or web pages change. In an assay, URLs may be reviewed using duplication technology and/or other techniques to determine if a video and/or a web page has changed, which would allow unnecessary analysis to be skipped if no change was detected. For example, an assay of a domain, such as www.veenome.com, may be requested. The assay may then automatically visit ("crawl") a particular web page of a domain, a portion of all of the web pages of a domain, and/or all of the web pages of a domain. Each of the web pages crawled may be analyzed as a web page URL, as discussed above.

For each web page visited, the assay may attempt to detect one or more videos on the web page. For each video detected, the assay may perform a viewability evaluation and/or a classification evaluation, as described above. The results may then be stored in a database. Further, for each run of an assay, the results may be stored separately to provide historical information. An assay may use any of the one or more steps of method 300, as described in reference to FIG. 3, and/or one or more of the processes of system 400, as described in reference to FIG. 4.

There may be several configuration options for an assay, including but not limited to: (i) scheduling for automatic repeating of an assay at one or more predetermined intervals; (ii) setting an assay to be performed on all web pages of a domain or a portion of web pages of a domain; (iii) setting an assay, when repeating a previous assay, to continue where the previous assay left off and/or to continue to crawl a web page where a previous crawl left off in a case of partial crawl; (iv) setting an assay to randomly crawl web pages of a domain, to breadth-first crawl web pages of a domain, or to depth-first crawl web pages of a domain for either an assay on a portion of web pages of a domain and/or an assay on all web pages of a domain; (v) setting a maximum and/or minimum number of videos to find; (vi) setting which information to save for each video, such as whether to save the general category, classification, brand safety information, viewability score, date, etc.; (vii) setting which configurations to actually use when running classification, viewability scoring, category, and/or brand-safety determinations; and/or (viii) setting crawling rules, such as each domain having associated rules that instruct the assay which web pages to visit, where the rules may be implemented using a general-purpose rule system, which may be regular expressions and/or other descriptions that provide instructions.

In one embodiment, an assay may be configured into an assay group, which allows a group of domains to have an assay run with similar rules. Alternatively, or additionally, an assay group may have a different set of rules for each domain.

As mentioned above, duplication technology and/or other techniques may be used to determine if a video and/or a web page has changed. For each video being analyzed and/or evaluated via an assay, a video job, and/or a page job, sixty or more images may be produced as frames, for example, when the video is evaluated at approximately a 1 second interval. When a new page URL is evaluated for one or more videos and/or a video of a new video URL is evaluated, a duplicate detection engine may determine if a video with similar images has been previously analyzed. The duplicate detection engine may be able to determine whether a video is a duplicate even if the frames produced for a potential duplicate video are not identical to the frames of a previously analyzed video. The frames of the potential duplicate may differ from the frames of the previously analyzed video in one or more ways including, but not limited to, a scale of the frames/video; a time in the video when the frames were produced, which may be caused by a video jitter and/or other reasons; an offset of the frames by an amount, which may be caused by different framing areas; and/or a number of images taken.

The duplicate detection engine may analyze each video and/or associated frames that have been stored, and may compare one or more of the previously analyzed videos and/or associated frames against the potential duplicate video. The duplicate detection engine may then assign a duplicate score for each comparison. If a particular duplicate score is high, the potential duplicate video may be determined to be a duplicate. If there are no high duplicate scores, then the potential duplicate video may be stored for subsequent comparisons. When a potential duplicate video is determined to be a duplicate, no further analysis is needed, as the information stored in relation to the previously analyzed video may be copied and returned.

The duplicate detection engine may also be used to detect if a particular sequence of frames has been previously analyzed. For example, a scene in a video being analyzed may also be a scene in a previously analyzed video. When a potential duplicate scene in a video is determined to be a duplicate, no further analysis is needed, as the information stored in relation to the previously analyzed scene in a stored video may be copied and returned. Using this video and/or scene duplicate analysis, the duplicate detection engine may be able to determine if a particular scene and/or video contains one or more of video games and/or advertisements, which may be used for ad detection.

When a video is determined to be an advertisement and/or a scene is determined to be an advertisement by the duplicate detection engine, this information may be stored. Such advertising information may be used to create an advertisement inventory in which video advertisements and/or the brands being represented in the video advertisements are monitored and/or tracked for a particular web page of a domain, a portion of a domain, and/or a domain at a given time. The rate at which the advertisements change may also be computed and stored. Advertisers and/or other entities may use the results to see what competitors are doing and/or may use the results as a guide for what to do.

Results of an assay may be provided in one or more formats and/or displays. Results may be transmitted and/or downloaded as a comma-separated values ("CSV") file. The CSV file may contain details of all of the configurations and operations performed on web pages of domains. Alternatively, the CSV file may contain a summary/aggregated report. A summary report for a domain may include rolled-up results for all parameters being studied, in total, in percentages, and/or may include only the top 10 parameters.

Additionally, assay reports may be viewed through a website and/or API, such as public site 410 and/or customer program 405. Results may be viewed for a single assay, and/or for assays conducted at various time intervals, to see how various results for a domain change with each assay performed over time. All parameters for assay and/or an assay group may be set via a web page and/or an API, such as public site 410 and/or customer program 405.

An assay, as well as a page job, may be used to determine one or more rates at which video content of a web page, portions of a domain, and/or a domain change. Each time an assay and/or a page job analyzes a web page a subsequent time, videos subsequently found may be compared against videos previously found. The result of the comparison may be used to compute a rate of change, and stored in the results of the assay and/or the results of the page job. Advertisers and/or any other interested entity may use this information to fine tune the desire to repeat a page job and/or to repeat an assay for a particular web page, a portion of a domain, and/or a domain. The average rate of change may also be used to determine how often a page job, an assay for a particular web page, an assay for a portion of a domain, and/or an assay for a domain may be repeated to maintain accuracy.

A benefit of the present disclosure is that a supply side platform ("SSP"), which sends and/or receives offers for advertisements to be provided on videos and/or web pages, may be able to use one or more of the viewability scores, classification results, assay results, and/or group assay results. The offers that an SSP sends and/or receives may be bids at various bid rates depending on information provided by the SSP. For example, if nothing is known about a video, the bid rates may be low. However, if a lot information is known about the video, the bid rates may be high. One or more assays may be performed for an SSP at a time before the bidding process. The assay results may be collected for one or more domains, and the assay result may be quickly accessed, which may involve using a real-time bidding system.

The assay results for one or more domains may increase the possibility of higher bid prices. For example, an advertiser, via a Demand Side Platform ("DSP"), may want to advertise only on sports videos that were deemed "brand safe." Without the assay results in the bidding process, the bid prices may be low because the advertiser may not know anything about a particular video. However, if there were detailed information available for the particular video from the assay results, then the advertiser may bid a higher price because the advertiser may be able to determine that the video is sports related and/or brand safe. Further, the SSP may use statistical percentages provided in and/or derived from the assay results to determine an initial bid price. For example, an SSP may have a low initial bid price for an offer to advertise in a video and/or web page when no viewability information is available, and the SSP may have a high initial bid price for an offer to advertise in a video and/or web page when detailed information is available from the assay.

As a further example, a domain that has assay results may show that 80% of the videos on the web pages of the domain contain sports. Higher bids may be obtained from an advertiser that wants to advertise sports related advertisements. Further, if the assay results show that a particular video for a web page is sports related, even higher bids may be obtained from an advertiser that wants to advertise on a sports video.

In one another embodiment of the present disclosure, one or more assay results from a domain may be used to arbitrage an offer for an advertisement. If the category, classification, brand safety information, and/or other viewability information of a particular video is unknown, the price a publisher may charge for an offer for an ad may be low. A third-party entity, other than a publisher or an advertiser, may have an assay performed and/or use one or more assay results of a domain of a publisher to buy a low offer, and sell the low offer at a higher price to an advertiser that would be interested in the offer.

An arbitrage system of the present disclosure may buy video advertising slots from an exchange at a low price. In one embodiment, the arbitrage system may buy video advertising slots that are uncategorized, unclassified, of unknown brand safety, and/or have no viewability information. The arbitrage system may conduct an assay of the domain in which the video advertising slot resides after buying the slots. Alternatively, the arbitrage system may conduct an assay of the domain in which the advertisement slot resides prior to buying the video advertising slots. The assay may be setup to determine specific information for the video advertising slots, such as a desirable category and/or classification. Once the video advertising slots are bought and an assay has been performed, the video advertising slots may be placed back on the same exchange and/or a different exchange at a higher price with additional information based on the assay results.

In another embodiment of the present disclosure, an advertiser may redirect attempts to serve an advertisement from advertisement servers of the advertiser to an advertisement server proxy (hereafter, "ASP"), instead of via a content distribution network ("CDN"). The ASP may determine and keep statistics on impressions, page URLs, and/or video URLs directed to the ASP by the advertiser. The ASP may use an assay, a viewability score analysis, and/or a classification evaluation, as described above, to obtain information about one or more web pages and/or videos that have been redirected to it. Once the ASP has obtained the information, the ASP may redirect ad requests back to the CDN to serve the ad. The information gathered by the ASP may be stored for each advertisement request, including, but not limited to an impression count, a page URL, one or more video URLs, a category, a classification, brand safety information, viewability, etc. The information collected by the ASP may then be collated and presented to the advertiser in the form of a report, an online dashboard, a web page, and/or through an API.

In yet another embodiment of the present disclosure, an advertiser and/or ad server may be set up to send a tracking pixel to a video analyzer server each time a video advertisement is served. The tracking pixel may include information about the web page URL, the video URL, the advertiser, etc. The video analyzer server may determine whether the web page and/or the video has been previously analyzed for one or more of: a viewability score, category, classification, and/or brand safety information. If the video analyzer server has previous analysis, the results may be immediately forwarded to the advertiser and/or ad server via a predetermined protocol.

If the video and/or the web page have not been previously analyzed, the video analyzer may use the system 400 to analyze the video and/or web page. The results obtained may then be forwarded to the advertiser and/or ad server. The advertiser and/or ad sever may then decide, on the basis of information forwarded by the video analyzer, which advertisement to serve on a particular video. For example, if a video is not brand safe, the advertiser and/or ad server may decide not to serve an advertisement. If the category and/or classification of the video is "sports," for example, the advertiser and/or ad server may serve an advertisement that requires a sports category or classification, or serve an advertisement that is generic to a category or classification.

Any of the above-described techniques be implemented by server systems 106, as shown in FIG. 2, including components therein. Additionally, any of the above-described techniques may implement one or more steps of method 300, as described in reference to FIG. 3, and/or one or more of the processes of system 400, as described in reference to FIG. 4.

Any of devices of users/viewers 102, video publishers 104, video advertisers 105, server systems 106, content distribution network 114, video hosting site 116, ad network servers 118, and/or the system 400 and/or subsystems of system 400 may include any type or combination of computing systems, such as handheld devices, personal computers, servers, clustered computing machines, and/or cloud computing systems. In one embodiment, devices, servers, systems, and/or databases may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor ("DSP") hardware, or any other hardware capable of executing software. The user interface may include any type or combination of input/output devices, such as a display monitor, touchpad, touchscreen, microphone, camera, keyboard, and/or mouse.

Figure 5:
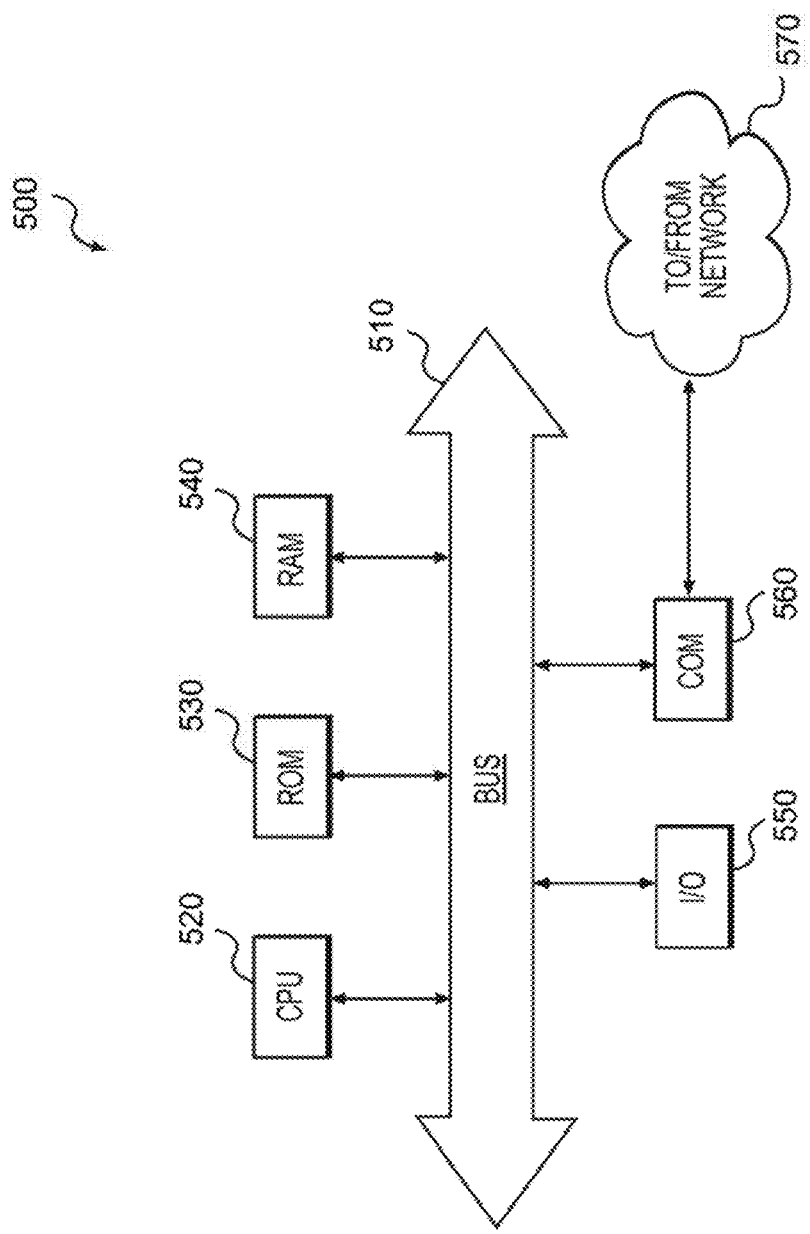
FIG. 5 is a simplified functional block diagram of a computer that may be configured as a device or server for executing the method of FIG. 3 and the processes of the system of FIG. 4, according to exemplary embodiments of the present disclosure.

FIG. 5 is a simplified functional block diagram of a computer that may be configured as a device, server, system, subsystem, or database for executing the methods of FIG. 3 and the processes of the system of FIG. 4, according to exemplary embodiments of the present disclosure. Specifically, in one embodiment, as shown in FIG. 5, any of the Internet devices, servers, and/or databases may be an assembly of hardware 500 including, for example, a data communication interface 560 for packet data communication. The platform may also include a central processing unit ("CPU") 520, in the form of one or more processors, for executing program instructions. The platform typically includes an internal communication bus 510, program storage, and data storage for various data files to be processed and/or communicated by the platform such as ROM 530 and RAM 540, although the system 500 often receives programming and data via network communications 570. The server 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting Internet/HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for evaluating online videos, the method comprising:
   receiving, at one or more servers, a plurality of URLs to be reviewed in relation to a web domain;
   detecting, by the one or more servers, for any URL determined to be a web page URL of the web domain, whether a web page of the URL includes one or more videos;
   if a video is detected on a web page of a web page URL, optionally determining, by the one or more servers, for any video detected on a web page of a web page URL of the web domain, at least one of a size of the video and a position of the video on a web page of the web page URL;
   if a video is detected on a web page of a web page URL, optionally computing, by the one or more servers, for any video detected on a web page URL of the web domain, a viewability score based on the determined size of the video and the determined position of the video on the web page of the web page URL;
   identifying, by the one or more servers, for any URL determined to be a video URL, a video to be classified by the one or more servers;
   classifying, by the one or more servers, each video detected on a web page of a web page URL and each video of a video URL of the web domain, based on analysis of at least two frames of at least part of the video, wherein each frame is obtained by a frame grabber at one or more predetermined intervals during playback of the video;
   analyzing, by the one or more servers, the classification result of each video using at least one of statistical techniques and heuristic techniques;
   computing and storing, by the one or more servers, a rate at which video content of the web domain is changed based on a comparison of videos detected on the web domain against videos previously detected on the web domain, wherein the web domain is visited automatically and at a predefined frequency to perform the computing;
   generating, by the one or more servers, an assay to perform analysis of classified videos for the web domain based on the classifying, wherein the assay automatically visits the web domain to perform analysis; and
   determining, by the one or more servers, a frequency for repeating the assay for the web domain based on the computed and stored rate at which video content of the web domain is changed, and automatically repeating the assay based on the determined frequency.

2. The method of claim 1, further comprising:
   receiving, for a web page URL, a web page,
   wherein obtaining at least two frames of at least part of the video comprises:
      obtaining, by the one or more servers, for each video detected on the web page URL, at least two screenshots of at least part of the video on the web page, wherein each screenshot is obtained at one or more predetermined intervals during playback of the video; and
      obtaining, by the one or more servers, for each video detected on a web page URL, each frame of the at least two frames from a screenshot of the at least two screenshots based on the size of the video and the position of the video on the web page, wherein each frame of the at least two frames is obtained from a different screenshot of the at least two screenshots.

3. The method of claim 1, further comprising:
   generating an assay of classified videos for the web domain based on the classifying; and
   setting or receiving an advertising bid or an advertising rate for the web domain based on the generated assay for the web domain or the computed rate of the web domain.

4. The method of claim 1, wherein classifying each detected video based on the at least two frames uses at least one of computer vision techniques and crowdsourcing techniques.

5. The method of claim 1, further comprising:
filtering, by the one or more servers, the videos detected on the web pages of the web domain based on the classification result of each video.

6. The method of claim 1, further comprising:
storing, by the one or more servers, at least one of the viewability score and the classification result computed for each video in at least one database.

7. The method of claim 1, wherein the one or more predetermined intervals includes intervals of about 0.1 seconds to about 10 seconds.

8. A system for evaluating online videos, the system comprising:
a memory device storing instructions for evaluating online videos; and
a processor configured to execute the instructions to perform a method of:
receiving, at one or more servers, a plurality of URLs to be reviewed in relation to a web domain;
detecting, by the one or more servers, for any URL determined to be a web page URL of the web domain, whether a web page of the URL includes one or more videos;
if a video is detected on a web page of a web page URL, optionally determining, by the one or more servers, for any video detected on a web page of a web page URL of the web domain, at least one of a size of the video, and a position of the video on a web page of the web page URL;
if a video is detected on a web page of a web page URL, optionally computing, by the one or more servers, for any video detected on a web page URL of the web domain, a viewability score based on the determined size of the video and the determined position of the video on the web page of the web page URL;
identifying, by the one or more servers, for any URL determined to be a video URL, a video to be classified by the one or more servers;
classifying, by the one or more servers, each video detected on a web page of a web page URL and each video of a video URL of the web domain, based on analysis of at least two frames of at least part of the video, wherein each frame is obtained by a frame grabber at one or more predetermined intervals during playback of the video;
analyzing, by the one or more servers, the classification result of each video using at least one of statistical techniques and heuristic techniques;
computing and storing, by the one or more servers, a rate at which video content of the web domain is changed based on a comparison of videos detected on the web domain against videos previously detected on the web domain, wherein the web domain is visited automatically and at a predefined frequency to perform the computing;
generating, by the one or more servers, an assay to perform analysis of classified videos for the web domain based on the classifying, wherein the assay automatically visits the web domain to perform the analysis; and
determining, by the one or more servers, a frequency for repeating the assay for the web domain based on the computed and stored rate at which video content of the web domain is changed, and automatically repeating the assay based on the determined frequency.

9. The system of claim 8, wherein the processor is further configured to execute the instructions to perform:
receiving, for a web page URL, a web page,
wherein obtaining at least two frames of at least part of the video comprises:
obtaining, by the one or more servers, for each video detected on the web page URL, at least two screenshots of at least part of the video on the web page, wherein each screenshot is obtained at one or more predetermined intervals during playback of the video; and
obtaining, by the one or more servers, for each video detected on a web page URL, each frame of the at least two frames from a screenshot of the at least two screenshots based on the size of the video and the position of the video on the web page, wherein each frame of the at least two frames is obtained from a different screenshot of the at least two screenshots.

10. The system of claim 8, further comprising:
generating an assay of classified videos for the web domain based on the classifying; and
setting or receiving an advertising bid or an advertising rate for the web domain based on the generated assay for the web domain or the computed rate of the web domain.

11. The system of claim 8, wherein classifying each detected video based on the at least two frames uses at least one of computer vision techniques and crowdsourcing techniques.

12. The system of claim 8, wherein the processor is further configured to execute the instructions to perform:
filtering, by the one or more servers, the videos detected on the web pages of the web domain based on the classification result of each video.

13. The system of claim 8, wherein the processor is further configured to execute the instructions to perform:
storing, by the one or more servers, at least one of the viewability score and the classification result computed for each video in at least one database.

14. The system of claim 8, wherein the one or more predetermined intervals includes intervals of about 0.1 seconds to about 10 seconds.

* * * * *